United States Patent Office 3,704,274
Patented Nov. 28, 1972

3,704,274
METHOD OF INCREASING THE SCORCH LIFE
OF BUTYL RUBBER
John E. Callan, Trenton, N.J., assignor to Cities
Service Company, New York, N.Y.
No Drawing. Filed Dec. 18, 1970, Ser. No. 99,687
Int. Cl. C08f 41/12, 45/28, 45/58
U.S. Cl. 260—33.6 AQ    15 Claims

ABSTRACT OF THE DISCLOSURE

A solution is prepared of butyl rubber and a phenol curing resin in an organic solvent, and the solvent is then evaporated to provide dry butyl rubber having the resin intimately dispersed therein. Compounds produced from this resin-containing rubber are characterized by a scorch life which is considerably longer than that which is achieved by conventional dry mixing of the rubber with the curing resin. This new process can be used to particular advantage in the manufacture of curing bags which are used to apply internal heat and pressure to pneumatic vehicle tires during the vulcanization thereof.

BACKGROUND OF THE INVENTION

Butyl rubber is a well-known commercial synthetic rubber made by copolymerizing an isoolefin, usually isobutylene, with a minor proportion of a conjugated diolefin, usually isoprene or butadiene. The isoolefins used generally have from four to seven carbon atoms, and such isomonoolefins as isobutylene or ethyl methyl ethylene are preferred. The diolefins employed are usually ordinary open-chain conjugated diolefins having from four to eight carbon atoms, among which may be mentioned in addition to the commonly employed isoprene and butadiene, such compounds as piperylene; 2,3-dimethyl-1,3-butadiene; 3-methyl-1,3-pentadiene; 2-methyl-1,3-pentadiene; 1,3-hexadiene; and 2,4-hexadiene. Butyl rubber contains relatively small amounts of copolymerized diene, typically from about 0.5 to 5%, and seldom more than 10%, on the total weight of the elastomer.

Large quantities of butyl rubber are utilized each year in the manufacture of curing bags. When producing a pneumatic tire, it is customary to employ an inflatable annular toroidal form, usually made of vulcanized rubber, and known in the art as a "curing bag," "water bag" or "curing bladder." The curing bag is disposed within the raw tire casing as an aid in shaping the tire, and also for the purpose of supplying internal heat and pressure to the tire casing in the molding press in which the tire is vulcanized. For this purpose, the bag is inflated with a fluid heating medium, usually hot water under pressure which causes the bag to expand and thereby force the tire casing into close conformity with the vulcanizing mold. Upon completion of the vulcanization, the curing bag is removed from the cured tire and is inserted into another new tire for repetition of the curing operation. The bag is thus repeatedly reused for a number of tire curing cycles.

Curing bags are expensive to produce and they must have good flex resistance and heat aging properties. Butyl rubber is naturally suited to the purpose and phenolic resin curing agents can be used to provide curing bags which have maximum strength and life under the severe conditions at which they are employed. Suitable phenolic resins which can be used for curing butyl rubber are dimethylol phenols, or phenol dialcohols, produced by reaction of para-alkyl phenol with an aldehyde in the presence of alkali. Curing bags produced with such resins do in fact have better heat and flex resistance than can be achieved with a sulfur or quinoid curing system, but an excessively long period of time is required for vulcanizing the bags before they can be placed into service; e.g. about two to three hours at 350° F. and about six hours at 310° F.

Resin cure of butyl rubber can be accelerated by means of a halogen donor such as stannous chloride or neoprene rubber. More recently it has been found that by substituting the OH of the methylol group of the resin with bromine the resulting resin is rendered self-activating in curing of the butyl rubber, and as a consequence no additional halogen donor is required for achieving cure at reasonable conditions; e.g. less than two hours at temperatures within the range of about 320° F.–330° F. Phenol curing resins—either of the methyl halide variety or dimethyl phenols which are accelerated by means of halogen donors—are effective in producing a curing bag characterized by good heat aging and flex resistance, but processing of the unvulcanized stock which contains the resin is frequently hampered by excessive scorchiness. As might be expected, a method has long been sought for producing a relatively fast vulcanizing butyl rubber curing bag compound which is also characterized by slow scorching tendencies.

SUMMARY OF THE INVENTION

The present invention is based on the discovery that the scorching tendency which is imparted to butyl rubber by a methyl halide phenol curing resin, or by a dimethyl phenol resin the presence of a halogen donor, can be dramatically reduced by dissolving both the rubber and the resin in an organic solvent, followed by evaporation of the solvent to provide dry butyl rubber having the resin discretely dispersed therein.

Contrary to what would have been expected heretofore, the increase in scorch life which is made possible by the present process appears to result from the fact that the dispersion of resin in the rubber is more complete than can be accomplished by conventional Banbury or calender mixing techniques whereby the rubber and resin are mixed together in a substantially dry state. Since in accordance with the invention the amount of curing resin does not have to be reduced to provide the desired results, it is therefore suspected that the phenol curing resin can not be ultimately dispersed in butyl rubber by a dry mixing method, and as a consequence the relatively short scorch life of dry mixed compounds results from premature curing (scorch) in areas of high resin concentration.

In the present invention, therefore, intimate blending of the rubber and the curing resin is effected by placing both into solution coextensively followed by removal of the solvent prior to vulcanization of the rubber. Thereafter, the resulting resin-containing butyl rubber can be mixed with other rubber compounding ingredients by means of conventional techniques to provide a complete compound which can in turn be processed and vulcanized for manufacture of curing bags. More preferable than dry mixing, however, is the incorporation of one or more of the other ingredients into the solution of rubber prior to removal of the solvent, thus reducing or eliminating the need for dry mixing of the ingredients later on. Ingredients which can be thoroughly blended into the rubber solution prior to removal of the solvent include carbon black, a rubber processing or extending oil, zinc oxide, an antioxidant, and neoprene rubber or stannous chloride when the curing resin is a dimethylol phenol resin. To advantage, organophilic, water-stable ingredients such as carbon black may first be discretely dispersed in water, followed by vigorous mixing of the resulting aqueous slurry of the black with the rubber solution, since transfer of the carbon black from the aqueous phase to the organic phase is the results of this procedure and it provides very intimate blending of the carbon black with the rubber. Subsequently, water and solvent can be removed from the rubber to provide a rubber masterbatch which contains carbon black, the resin, and any other rubber compounding ingredient which was included in the solution. Furthermore, all these ingredients can be thoroughly blended into the rubber by means of this process and are retained therein upon removal of the solvent and water.

The present process can be used to reduce the scorching tendency of any vulcanizable butyl rubber composition that is cured by means of a phenol curing resin, but as has been indicated heretofore, it can be employed to particular advantage in the manufacture of high quality curing bags since the vulcanizate from which the bags are produced is relatively nonscorching and fast curing.

DETAILED DESCRIPTION OF THE INVENTION

Any suitable solvent can be employed for providing a solution of butyl rubber in which the phenol curing resin is dissolved and incorporated into the rubber in accordance with this invention. The term "solution" or "solution of rubber" as used herein applies to true solutions of butyl rubber in an organic solvent as well as to quasi or "partial" solution wherein the butyl rubber exist to a large extent as very small, swelled particles. The present invention, therefore, contemplates addition of a phenol curing resin to the effluent stream of a butyl rubber polymerization reactor and wherein the rubber exists as tiny, swelled particles suspended in methyl chloride. In such cases the reactor effluent stream is passed into a water bath for vaporization and removal of the methyl chloride. The rubber forms as a wet crumb and is recovered and dried. In accordance with the present invention, the curing resin can be added to the reactor effluent stream prior to the solvent vaporization step. In other cases it may be preferable to carry out the invention separately from the rubber polymerization-recovery steps and to employ a less volatile solvent. Almost any solvent can be employed provided that both the rubber and the curing resin are at least partially soluble in it. Furthermore, the solvent should not be detrimentally reactive with the rubber or the resin, or with any other compounding ingredient which is dispersed in the solution, and it should be volatile at a temperature which is well below that at which vulcanization or thermal degradation of the rubber in the compound can occur. Some suitable solvents which can be employed in the practice of the present process include: hexane, benzene, toluene, petroleum spirits, chloroform, carbon tetrachloride, trichloroethylene, ether, and the like.

The amount of rubber which is dissolved in the solvent is not critical in the present process but it is usually preferable to dissolve a maximum amount short of imparting a viscosity to the solution that impairs its formation and subsequent processing for removal of the solvent. The amount of rubber which can be satisfactorily dissolved in any given case will be variable, of course, depending upon the type of solvent employed. Furthermore, if substantial quantities of carbon black and/or other fillers are to be dispersed in the solvent, this factor must also be considered since the multiplication product of input work times the length of time involved for discretely dispersing these fillers into the rubber solution increases as the viscosity of the system increases. When using solvents such as hexane, toluene, and benzene, concentrations of rubber within the range of about 10 to about 30 weight percent can usually be employed to advantage although higher and lower concentrations can also be employed where preferable and practical.

The present process can be practiced while using any suitable dimethylol phenol or methyl halide phenol resin for curing of the butyl rubber. Methyl halide phenol resins are preferred, and the bromomethyl, alkylated phenolformaldehyde resins which are currently used in the curing of butyl rubber are especially preferred. However, dimethylol phenol resins can also be employed along with a halogen donor such as neoprene rubber, stannous chloride, or the like. Such halogen donors can, where preferred, be mixed with the butyl rubber-resin blend after removal of the solvent therefrom. To advantage, however, the halogen donor can be incorporated into the solution of rubber and resin prior to removal of the solvent, and when neoprene is used it can be dissolved in the solvent along with the butyl rubber and the resin.

The amount of resin which is mixed with the rubber is variable depending upon the particular type of resin employed and also upon the state of cure desired. Generally, it will be desirable to employ an amount of resin which is within the range of about one to about sixteen parts per 100 parts by weight of rubber, and more often an amount which is within the range of about five to about twelve parts per 100 parts by weight of the rubber.

Dissolution of the butyl rubber and the resin in the solvent may be accomplished by any suitable means, e.g. by means of vigorous agitation and perhaps some degree of heating while maintaining both temperature and shear below levels which preclude substantial vaporization of the solvent and degradation of the rubber.

Once the rubber and the resin have been dissolved and thoroughly mixed together, the solvent can be vaporized by simple heating of the solution to a temperature at which solvent evaporation and removal can be accomplished within a reasonable length of time. Where preferred, solvent evaporation can be assisted with a vacuum. To advantage, however, the solvent can be vaporized by adding the solution of rubber and resin to an agitated body of hot water maintained above the boiling point of the solvent. By means of this technique the solvent can be vaporized and removed from the rubber compound very rapidly and the rubber solidifies in the form of wet crumbs which can be recovered from the water bath and dried to provide a dry rubber product which also contains the curing resin which was dissolved in the solvent along with the rubber. In addition, the dry rubber will also contain any other rubber compounding ingredients which were placed into solution with the rubber and resin, e.g. carbon black, zinc oxide, an antioxidant, a process or extender oil, a halogen donor or the like. It will, therefore, be appreciated that a "total" masterbatch can be produced by this technique; that is, a butyl rubber masterbatch can be produced which contains all of the ingredients that are to be incorporated into the rubber prior to the vulcanization thereof.

As previously indicated, dry carbon black can be added to the rubber solution and dispersed therein prior to evaporation of the solvent when the endeavor is to produce a black rubber masterbatch. However, a more preferable technique is to first mix the carbon black with water and produce an aqueous slurry in which the carbon black is discretely dispersed. Thereafter, the aqueous slurry of the black can be vigorously mixed with the solution of rubber and resin, for such will result in transfer of the carbon black from its aqueous medium into the organic phase, i.e. into the solution of rubber and resin while providing very discrete dispersion of the black in the rubber. In such a case the solvent need not be miscible with water, for regardless of whether it is or not the mixture of water, carbon black, solvent, rubber and curing resin can be introduced into an agitated body of hot water for vaporization and removal of the solvent and for formation of a rubber crumb in which both the carbon black and the resin are bound and discretely dispersed in the rubber. When it is desirable to include still other ingredients in the rubber compound, materials such as zinc oxide, an oil, anti-oxidant, and the other fillers can be incorporated into the solution of rubber and resin prior to mixture thereof with the aqueous slurry of carbon black. In accordance with the procedure, all of these ingredients become bound into the rubber to the extent that they are substantially completely recovered therewith upon evaporation of the solvent and removal of water from the resulting wet crumbs of rubber.

When carbon black is incorporated into the rubber during the practice of the present process, the type and amount of black employed is a matter of choice which belongs to the compounder, since the invention is operable with practically any carbon black and with black loadings up to about 200 parts per 100 parts by weight of rubber. Generally, carbon black loadings within the range of about 40 to about 125 parts per 100 parts by weight of rubber and be employed to advantage although higher and lower loadings can be used when called for by a particular recipe.

When carbon black is first formed into an aqueous slurry prior to mixture with the solution of rubber and resin, the concentration of black in water can generally be within the range of about five to about fifteen weight percent, depending upon the type of black being used, and a concentration within the range of about seven to about ten percent is frequently preferred. However, concentrations of black which are higher than those indicated can also be employed provided that the slurry can be easily produced, handled, and thoroughly mixed with the cement. Apparatus and methods for producing discrete dispersions of carbon black in water are well known and need not be described in detail herein.

When zinc oxide, an oil, an antioxidant, another filler, or combinations thereof are to be included in the rubber compound, amounts as are called for in the recipe can be dissolved or dispersed in the rubber solution since the inclusion of conventional amounts of the ingredients in the solution does not normally bring on any undesirable reaction or excessive thickening thereof.

EXAMPLE

Butyl rubber curing bag stocks were produced in accordance with the following recipe:

RECIPE

| | Parts by weight |
|---|---|
| Bucar 5000S [1] | 100 |
| Statex R [2] | 50 |
| Zinc oxide | 5 |
| Amberex BR [3] | 5 |
| Thermoflex A [4] | 1 |
| SP-1055 [5] | 12 |

[1] Butyl Rubber, Cities Service Company.
[2] HAF Carbon Black, Cities Service Company.
[3] Vulcanized Vegetable Oil, American Cyanamid Company.
[4] Antioxidant, E. I. du Pont de Nemours & Company.
[5] Bromomethyl, Alkylated, Phenol-Formaldehyde Curing Resin, Schenectady Chemicals, Incorporated.

In preparing Compound A, all of the ingredients of the recipe were thoroughly blended together in a Banbury mixer. Compound B, produced in accordance with the present process, was prepared as follows:

(1) Butyl rubber was ground into small pieces and was placed into hexane. The proportion of rubber to hexane in the mixture was such as to provide a 20 weight percent solution of rubber in solvent. The mixture was vigorously agitated at about 100° F. until dissolution of the rubber was completed. The methyl halide resin was then added to the rubber solution in an amount which provided 12 parts by weight of resin per 100 parts by weight of the rubber. To this solution of rubber and resin, the other ingredients of the recipe were added to provide 5,5 and 1 part per 100 parts by weight of rubber of the zinc oxide, the factice, and the antioxidant, respectively. Stirring of the solution was continued until dispersion of all ingredients in the solution was completed.

(2) HAF carbon black was continuously mixed with water at rates which provided an aqueous slurry wherein the concentration of the black was 8 weight percent. The slurry was subjected to high speed, high shear mixing actions which discretely dispersed the carbon black in the water.

(3) A stream of the aqueous carbon black dispersion and a stream of the rubber solution prepared in steps (1) and (2) above were fed continuously into still another high speed, high shear mixing device at constant rates. The rates of the streams were proportioned to provide 50 parts of carbon black per 100 parts by weight of rubber entering the mixer. Within the mixer the two streams were vigorously mixed together, thus effecting transfer of the carbon black from the aqueous phase into the rubber solution which already contained the curing resin, the zinc oxide, the factice, and the antioxidant. The mixing in this step also resulted in the formation of a temporary emulsion of the water and the rubber solution.

(4) The temporary emulsion of water and rubber solution was introduced continuously into a large body of vigorously agitated hot water that was contained in an enclosed vessel. The temperature of the water was maintained at about 200° F. This resulted in rapid vaporization of the hexane in the rubber solution droplets so that the rubber solidified and formed into crubs which floated to the top of the water. Vaporized hexane was removed from the tank and was condensed for reuse.

(5) The crumb rubber and some of the water were removed from the tank as a continuous stream. The crumb rubber was first partially dewatered by means of a screw press and was then passed into a drying-extruder for final removal of moisture under heat and pressure. The mositure content of the dried rubber was less than about one-half percent and further analysis revealed that the content of rubber, carbon black, zinc oxide, factice, antioxidant, and resin was in almost exact accordance with the receipe.

Compounds A and B were then subjected to various tests to determine some of the physical properties of each in the cured and uncured state. The results of these tests are shown in Table I.

TABLE I

| | Compounds | |
|---|---|---|
| | A | B |
| Stress-strain properties cured at 330° F.: | | |
| 90′ L-300% modulus | 900 | 890 |
| 90′ tensile strength | 2,000 | 2,050 |
| 90′ elongation | 660 | 670 |
| 90′ Shore hardness | 61 | 60 |
| Specific gravity | 1.119 | 1.117 |
| 90 specimens oven aged at 3 cycles of 8 hours in steams and 16 hours in air at 330° F.: | | |
| L-300 modulus | 1,040 | 1,030 |
| Tensile strength | 1,340 | 1,320 |
| Elongation | 430 | 460 |
| Percent tensile retained | 67 | 65 |
| Percent elongation retained | 65 | 68 |
| Goodrich flexometer HBU (° F.) 90° at 330° F | 98 | 143 |
| DeMattia flex tested at 190′ F. crack growth after 3 cycle aging: Average kilocycles to 50% failure | 112 | 400 |
| Uncured properties: | | |
| Mooney viscosity (ML-4 at 212° F.) | 110 | 102 |
| Mooney scorch ML at 300° F. (TMV + 10) | 5.9 | 25.6 |

As can be seen from Table I, Compound B which was produced in accordance with the present process was characterized by a scorch life of about 4 times that of the dry mixed control, Compound A. It should also be noted that the flexural strength of Compound B, as indicated by De Mattia Flex, was far in excess of that of the control compound. In addition, Compound B retained its cured physical properties after heat aging about as well as the control compound. The invention thus provided a vulcanizable curing bladder compound having a much longer scorch life; and, upon vulcanization, the composition was far superior with respect to flexural strength.

Expecting that the much longer scorch life of Compound B might have been explained by a partial migration or hydrolysis of the methyl halide phenol resin during mixture of the rubber solution with water, five dry mixed samples were prepared in accordance with the recipe shown above except that 10, 8, 6, 4 and 2 parts per 100 parts by weight of the resin was included in the respective mixes. Stress-strain and Mooney scorch properties of these samples is shown in Table II.

TABLE II

| | Samples | | | | |
|---|---|---|---|---|---|
| | 1 | 2 | 3 | 4 | 5 |
| Resin, parts by weight | 10 | 8 | 6 | 4 | 2 |
| Mooney scorch at 300° F. (TMV+10) | 8.2 | 8.8 | 13.1 | 19.0 | 100 |
| Stress-strain properties cured at 330° F.: | | | | | |
| 90′ L-300 modulus | 670 | 620 | 450 | 340 | 130 |
| 90′ tensile strength | 1,890 | 1,870 | 1,750 | 1,490 | 710 |
| 90′ elongation | 740 | 760 | 850 | 900 | 1,100 |
| 90′ Shore hardness | 54 | 55 | 52 | 47 | 44 |

The data of Table II indicated that reduction in the amount of curing resin employed with dry mixing of the recipe can extend scorch life, but when it is extended by this method to a degree anywhere near that available from the present invention, the rate and state of cure of the compound is greatly reduced. It is, therefore, apparent that the increase in scorch life and greater flexural strength provided to a rubber compound by the present invention are not available from dry mixing.

This invention has been described with reference to specific materials, conditions, proportions, and the like, but it will be understood that other embodiments will become apparent which are within the spirit and scope of the inveniton which is defined in the appended claims.

Therefore, what is claimed is:

1. A method of increasing the scorch life of a butyl rubber compound which is vulcanized by means of a phenol curing resin for the butyl rubber which comprises:
    (a) dissolving butyl rubber and said phenol resin in an organic solvent,
    (b) removing said solvent from the resulting solution,
    (c) recovering butyl rubber having said curing resin intimately blended therewith, and
    (d) subsequently vulcanizing the butyl rubber with phenolic curing resin by heating the blend recovered from step (c).

2. The method of claim 1 wherein said phenol curing resin is a dimethylol phenol resin.

3. The method of claim 2 and including the incorporation of a halogen donor in the resin-containing butyl rubber which is recovered from said solvent.

4. The method of claim 3 wherein said halogen donor is incorporated into the solution of rubber and resin prior to removal of said solvent therefrom.

5. The method of claim 3 wherein the halogen donor is neoprene rubber.

6. The method of claim 1 wherein said curing resin is a methyl halide phenol resin.

7. The method of claim 6 wherein said resin is a bromomethyl, alkylated, phenol-formaldehyde resin.

8. The method as defined in claim 1 and including the blending of said resin-containing butyl rubber with at least one other rubber compounding ingredient, and vulcanizing the resulting compound.

9. The method as defined in claim 8 wherein said compounding ingredient is thoroughly blended with the solution of rubber and resin prior to the removal of the solvent from the solution.

10. The method as defined in claim 9 wherein carbon black is blended with the resin-containing butyl rubber.

11. The method as defined in claim 9 wherein zinc oxide is blended with the resin-containing butyl rubber.

12. The method as defined in claim 9 wherein an oil is blended with the resin-containing butyl rubber.

13. The method as defined in claim 9 wherein an antioxidant is blended with the resin-containing butyl rubber.

14. The method as defined in claim 1 wherein:
    (a) said solution of rubber and curing resin is added to a body of hot water under agitation, and said solvent is thus vaporized and is then removed from the rubber,
    (b) said rubber is recovered from said body of hot water as water-containing crumb rubber having said curing resin bound in the rubber, and
    (c) said rubber crumb is dried for removal of water.

15. The method as defined in claim 10 wherein:
    (a) said carbon black is first dispersed in water,
    (b) the resulting aqueous dispersion of carbon black is mixed with said solution of rubber and resin under vigorous agitation, thus transferring the carbon black from the aqueous phase into the organic solution phase, and
    (c) butyl rubber filled with said carbon black and said curing resin is separated from said solvent and water.

References Cited

UNITED STATES PATENTS

| | | | |
|---|---|---|---|
| 2,962,479 | 11/1960 | Aldridge | 260—73 |
| 3,293,323 | 12/1966 | Gardner | 260—846 |
| 3,489,697 | 1/1970 | Brice | 260—2.5 |
| 3,350,342 | 10/1967 | Begley | 260—33.6 |
| 2,701,895 | 2/1955 | Tauney et al. | 260—85.3 X |
| 3,491,052 | 1/1970 | Hare | 260—29.7 |
| 3,023,188 | 2/1962 | Kraus | 260—41.5 |

MORRIS LIEBMAN, Primary Examiner

R. ZAITLEN, Assistant Examiner

U.S. Cl. X.R.

260—41.5 MP, 85.3 C, 846